(12) United States Patent
Furukawa et al.

(10) Patent No.: US 11,325,398 B2
(45) Date of Patent: May 10, 2022

(54) IMAGE PROCESSING DEVICE GENERATING DOT DATA USING MACHINE LEARNING MODEL AND METHOD FOR TRAINING MACHINE LEARNING MODEL

(71) Applicant: Brother Kogyo Kabushiki Kaisha, Nagoya (JP)

(72) Inventors: Koki Furukawa, Nagoya (JP); Masaki Kondo, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/775,448

(22) Filed: Jan. 29, 2020

(65) Prior Publication Data

US 2020/0247138 A1    Aug. 6, 2020

(30) Foreign Application Priority Data

Feb. 1, 2019  (JP) .............................. JP2019-017098

(51) Int. Cl.
| | | |
|---|---|---|
| *B41J 29/393* | (2006.01) | |
| *B41J 2/21* | (2006.01) | |
| *B41J 2/045* | (2006.01) | |
| *G06N 20/00* | (2019.01) | |
| *B41J 2/205* | (2006.01) | |

(52) U.S. Cl.
CPC ......... *B41J 2/2135* (2013.01); *B41J 2/04595* (2013.01); *B41J 2/2054* (2013.01); *B41J 2/2121* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2002/0140657 | A1* | 10/2002 | Iwasaki | ................. H04N 1/405 345/89 |
| 2010/0066777 | A1* | 3/2010 | Yoshida | ................... B41J 29/38 347/12 |

(Continued)

FOREIGN PATENT DOCUMENTS

| | | |
|---|---|---|
| JP | H04-047473 A | 2/1992 |
| JP | H05-225378 A | 9/1993 |

(Continued)

*Primary Examiner* — Erica S Lin
*Assistant Examiner* — Tracey M McMillion
(74) *Attorney, Agent, or Firm* — Burr & Brown, PLLC

(57) ABSTRACT

In an image processing device, a controller performs: acquiring target image data representing a target image; inputting first and second datasets into a machine learning model and causing the machine learning model to output first and second partial dot data; and generating dot data specifying a dot formation state for each of a plurality of pixels in a print image corresponding to the target image using the first and second partial dot data. The first dataset includes first partial image data and a first value for an input parameter. The second dataset includes second partial image data and a second value for the input parameter. The machine learning model outputs the second partial dot data different from the first partial dot data according to the second value being different from the first value even when the second partial image data is identical to the first partial image data.

4 Claims, 10 Drawing Sheets

(56) References Cited

U.S. PATENT DOCUMENTS

| | | | |
|---|---|---|---|
| 2011/0235071 A1* | 9/2011 | Fujita | B41J 2/2121 |
| | | | 358/1.9 |
| 2013/0028520 A1 | 1/2013 | Kondo et al. | |
| 2018/0246846 A1* | 8/2018 | Takimoto | G06N 3/08 |
| 2018/0315190 A1* | 11/2018 | Sasagawa | G06T 7/11 |

FOREIGN PATENT DOCUMENTS

| | | |
|---|---|---|
| JP | H11-055507 A | 2/1999 |
| JP | 2002-288589 A | 10/2002 |
| JP | 2013-030090 A | 2/2013 |

\* cited by examiner

IMAGE PROCESSING DEVICE GENERATING DOT DATA USING MACHINE LEARNING MODEL AND METHOD FOR TRAINING MACHINE LEARNING MODEL

CROSS REFERENCE TO RELATED APPLICATION

This application claims priority from Japanese Patent Application No. 2019-017098 filed Feb. 1, 2019. The entire content of the priority application is incorporated herein by reference.

TECHNICAL FIELD

The present disclosure relates to an image process for a print execution unit that forms dots on a printing medium.

BACKGROUND

A conventional technology used in an image processing device known in the art is applied to an image forming device, such as a laser photocopier. This image processing device inputs gradation values into a neural network for each pixel in an 8×8 matrix of pixels set in relation to a multi-valued original image. The image processing device performs thresholding using the neural network to output binary data for each pixel in a 4×4 matrix.

SUMMARY

However, the conventional technology cannot sufficiently reduce artifacts such as periodicity and false contouring appearing in images printed using binary data that degrade image quality. Consequently, the quality of images printed according to the conventional technology may suffer.

In view of the foregoing, it is an object of the present disclosure to provide a technology capable of improving the quality of images printed using dot data.

In order to attain the above and other objects, the present disclosure provides an image processing device configured to perform an image process for a printer. The printer is configured to form dots on a printing medium using colorant. The image processing device includes a controller. The controller is configured to perform: (a) acquiring; and (b) generating. The (a) acquiring acquires target image data representing a target image. The target image has a plurality of pixels. The (b) generating generates dot data specifying a dot formation state for each of the plurality of pixels in a print image corresponding to the target image. The (b) generating includes: (b1) inputting; (b2) inputting; and (b3) generating. The (b1) inputting inputs a first dataset into a machine learning model and causes the machine learning model to output first partial dot data. The first dataset includes first partial image data and a first value for an input parameter. The first partial image data corresponds to the target image data within a first input area in the target image. The first partial dot data specifies a dot formation state for each pixel in a first output area. The first output area includes a first corresponding area corresponding to the first input area in the print image. The (b2) inputting inputs a second dataset into the machine learning model and causes the machine learning model to output second partial dot data. The second dataset includes second partial image data and a second value for the input parameter. The second partial image data corresponds to the target image data within a second input area different from the first input area in the target image. The second value is different from the first value. The second partial dot data specifies a dot formation state for each pixel in a second output area. The second output area includes a second corresponding area corresponding to the second input area in the print image. The (b3) generating generates the dot data using the first partial dot data and the second partial dot data. The machine learning model is configured to output the second partial dot data different from the first partial dot data according to the second value being different from the first value even when the second partial image data is identical to the first partial image data.

According to another aspect, the present disclosure provides an image processing device configured to perform an image process for a printer. The printer is configured to form dots on a printing medium using colorant. The image processing device includes a controller. The controller is configured to perform: (a) acquiring; and (b) generating. The (a) acquiring acquires target image data representing a target image. The target image has a plurality of pixels. The (b) generating generates dot data specifying a dot formation state for each of the plurality of pixels in a print image corresponding to the target image. The (b) generating includes: (b1) inputting; (b2) inputting; and (b3) generating. The (b1) inputting inputs first partial image data into a machine learning model and causes the machine learning model to output first partial dot data. The first partial image data corresponds to the target image data within a first input area in the target image. The first partial dot data specifies a dot formation state for each pixel in a first output area. The (b2) inputting inputs second partial image data into the machine learning model and causes the machine learning model to output second partial dot data. The second partial image data corresponds to the target image data within a second input area adjacent to the first input area in the target image. The second partial dot data specifies a dot formation state for each pixel in a second output area. The (b3) generating generates the dot data using the first partial dot data and the second partial dot data. The first output area includes a first corresponding area corresponding to the first input area and a first overlapping area corresponding to a portion of the second input area in the print image. The second output area includes a second corresponding area corresponding to the second input area and a second overlapping area corresponding to a portion of the first input area in the print image. The first output area and the second output area overlap each other with an overlapping area including the first overlapping area and the second overlapping area. The first overlapping area overlaps with the second corresponding area. The second overlapping area overlaps with the first corresponding area.

According to still another aspect, the present disclosure also provides a method for training a machine learning model. The machine learning model receives an input of partial image data representing an input area of a target image and performs operations using a plurality of operation parameters to output partial dot data specifies a dot formation state of each pixel in an output area of a print image corresponding to the target image. The output area includes an area corresponding to the input area in the print image. The method includes: (a) acquiring; (b) inputting; and (c) adjusting. The (a) acquiring acquires a plurality of datasets including a first dataset and a second dataset. Each of the plurality of datasets includes input image data as a sample of the partial image data and a parameter value for an input parameter. The parameter value is selected from among a plurality of values. The first dataset includes specific input image data and a first parameter value. The second dataset includes the specific input image data and a second parameter value different from the first parameter value. The inputting inputs the plurality of datasets into the machine learning model and directs the machine learning model to output a plurality of partial dot data corresponding to respective ones of the plurality of datasets. The plurality of partial dot data includes first partial dot data corresponding to the first dataset and second partial dot data corresponding to the second dataset. The (c) adjusting adjusts the plurality of operation parameters using the plurality of partial dot data so that the first partial dot data is different from the second partial dot data.

According to still another aspect, the present disclosure also provides a non-transitory computer readable storage medium storing a set of program instructions. The set of program instructions is installed on and executed by a computer. The computer is configured to perform an image process for a printer. The printer is configured to form dots on a printing medium using colorant. The set of program instructions includes: (a) acquiring; and (b) generating. The (a) acquiring acquires target image data representing a target image. The target image has a plurality of pixels. The (b) generating generates dot data specifying a dot formation state for each of the plurality of pixels in a print image corresponding to the target image. The (b) generating includes: (b1) inputting; (b2) inputting; and (b3) generating. The (b1) inputting inputs a first dataset into a machine learning model and causes the machine learning model to output first partial dot data. The first dataset includes first partial image data and a first value for an input parameter. The first partial image data corresponds to the target image data within a first input area in the target image. The first partial dot data specifies a dot formation state for each pixel in a first output area. The first output area includes a first corresponding area corresponding to the first input area in the print image. The (b2) inputting inputs a second dataset into the machine learning model and causes the machine learning model to output second partial dot data. The second dataset includes second partial image data and a second value for the input parameter. The second partial image data corresponds to the target image data within a second input area different from the first input area in the target image. The second value is different from the first value. The second partial dot data specifies a dot formation state for each pixel in a second output area. The second output area includes a second corresponding area corresponding to the second input area in the print image. The (b3) generating generates the dot data using the first partial dot data and the second partial dot data. The machine learning model is configured to output the second partial dot data different from the first partial dot data according to the second value being different from the first value even when the second partial image data is identical to the first partial image data.

According to still another aspect, the present disclosure also provides a non-transitory computer readable storage medium storing a set of program instructions. The set of program instructions is installed on and executed by a computer. The computer is configured to perform an image process for a printer. The printer is configured to form dots on a printing medium using colorant. The set of program instructions includes: (a) acquiring; and (b) generating. The (a) acquiring acquires target image data representing a target image. The target image has a plurality of pixels. The (b) generating generates dot data specifying a dot formation state for each of the plurality of pixels in a print image corresponding to the target image. The (b) generating includes: (b1) inputting; (b2) inputting; and (b3) generating. The (b1) inputting inputs first partial image data into a machine learning model and causes the machine learning model to output first partial dot data. The first partial image data corresponds to the target image data within a first input area in the target image. The first partial dot data specifies a dot formation state for each pixel in a first output area. The (b2) inputting inputs second partial image data into the machine learning model and causes the machine learning model to output second partial dot data. The second partial image data corresponds to the target image data within a second input area adjacent to the first input area in the target image. The second partial dot data specifies a dot formation state for each pixel in a second output area. The (b3) generating generates the dot data using the first partial dot data and the second partial dot data. The first output area includes a first corresponding area corresponding to the first input area and a first overlapping area corresponding to a portion of the second input area in the print image. The second output area includes a second corresponding area corresponding to the second input area and a second overlapping area corresponding to a portion of the first input area in the print image. The first output area and the second output area overlap each other with an overlapping area including the first overlapping area and the second overlapping area. The first overlapping area overlaps with the second corresponding area. The second overlapping area overlaps with the first corresponding area.

BRIEF DESCRIPTION OF THE DRAWINGS

The particular features and advantages of the disclosure as well as other objects will become apparent from the following description taken in connection with the accompanying drawings, in which:

FIGS. 4A through 4C are explanatory diagrams for a machine learning model, in which FIG. 4A illustrates a dataset as an input of the machine learning model that includes a value "1" as an input parameter and partial dot data as an output of the machine learning model, FIG. 4B illustrates a dataset as an input of the machine learning model that includes a value "2" as the input parameter and partial dot data as an output of the machine learning model, and FIG. 4C illustrates a sample configuration of the machine learning model;

FIGS. 8A through 8C are explanatory diagrams illustrating generation of dot data, in which FIG. 8A illustrates an example in which an output area OA1 is a target output area, FIG. 8B illustrates an example in which an output area OA2 is a target output area, and FIG. 8C illustrates a result of generating all dot data for the corresponding region;

DETAILED DESCRIPTION

A. Embodiment

<A-1. Structure of an Image Processing Device>

Figure 1:
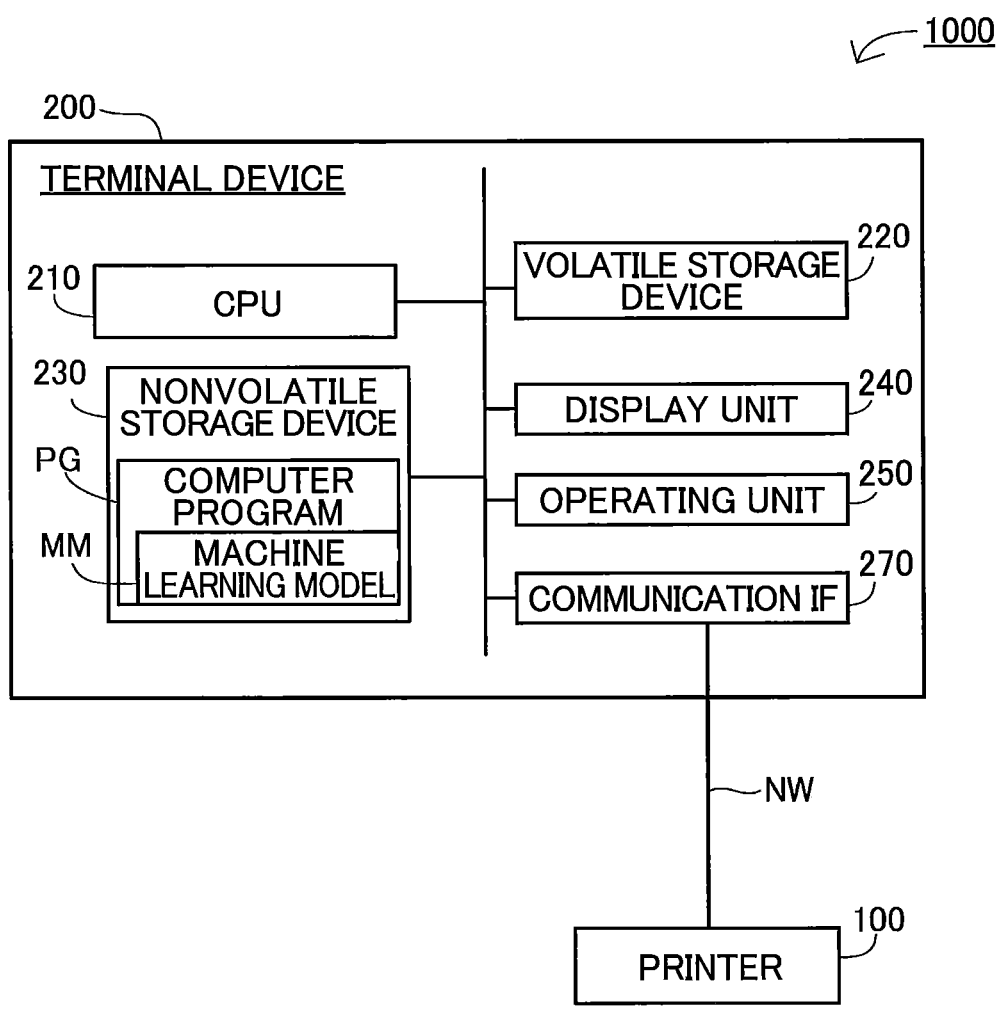
FIG. 1 is a block diagram illustrating the structure of a printing system including a terminal device according to one embodiment of the present disclosure.

Next, one embodiment of the present disclosure will be described while referring to the accompanying drawings. FIG. 1 is a block diagram illustrating the structure of a printing system 1000 according to the embodiment.

The printing system 1000 includes a printer 100, and a terminal device 200. The printer 100 is an example of the printer, and the terminal device 200 is an example of the image processing device according to the embodiment. The printer 100 and terminal device 200 are connected and capable of communicating with each other over a wired or wireless network NW.

The terminal device 200 is a personal computer, a smartphone, or another computerized device. The terminal device 200 is provided with a central processing unit (CPU) 210, which is the controller of the terminal device 200; a volatile storage device 220, such as a random access memory (RAM); a nonvolatile storage device 230, such as a hard disk drive or a flash memory; a display unit 240, such as a liquid crystal display; an operating unit 250, such as a keyboard, a mouse, and the like; and a communication interface 270. The communication interface 270 includes a wired or wireless interface for connecting to the network NW.

The volatile storage device 220 provides a buffer area for temporarily storing various intermediate data generated when the CPU 210 executes processes. The nonvolatile storage device 230 stores a computer program PG. The volatile storage device 220 and nonvolatile storage device 230 are an internal memory of the terminal device 200.

In the present embodiment, the computer program PG is a printer driver program that controls the printer 100. The computer program PG is provided in a format that is downloadable from a server operated by the manufacturer of the printer 100, for example. Alternatively, the computer program PG may be provided in a format stored on a digital versatile disc-read only memory (DVD-ROM) or the like. By executing the computer program PG, the CPU 210 implements an image process described later.

The printer 100 is an inkjet-type printing device that prints images by forming dots on paper or another printing medium. The printing agent used to form the dots is ink of a plurality of types (ink of the four colors cyan (C), magenta (M), yellow (Y), and black (K) in the present embodiment).

<A-2. Image Process>

Figure 2:
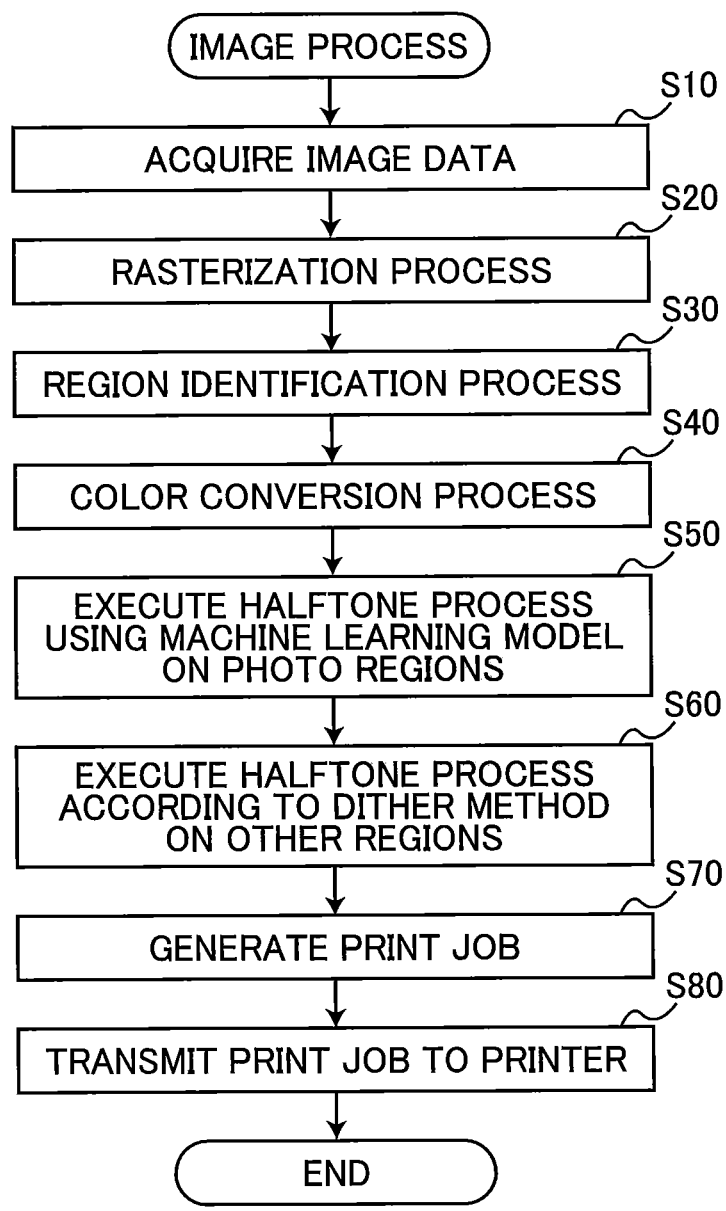
FIG. 2 is a flowchart illustrating steps in an image process performed by a CPU executing a computer program in the terminal device according to the embodiment of the present disclosure.

FIG. 2 is a flowchart illustrating steps in an image process performed by the CPU 210 executing the computer program PG in the terminal device 200. The image process is initiated by a start command from the user after the printer driver has been launched.

In S10 of FIG. 2, the CPU 210 acquires image data representing an image to be printed. This image data is data for a single image selected according to user instructions from data for a plurality of images stored in the nonvolatile storage device 230, for example. In S20 the CPU 210 performs a rasterization process on the acquired image data to generate target image data. In the present embodiment, target image data is bitmap data representing an image that has a plurality of pixels, and more specifically is RGB image data expressing the color for each pixel in RGB values. RGB values are gradation values for three color components (hereinafter called "component values"), and specifically the R value, G value, and B value in the RGB color space. Each of the R value, G value, and B value is a gradation value for one of 256 levels, for example.

Figure 3:
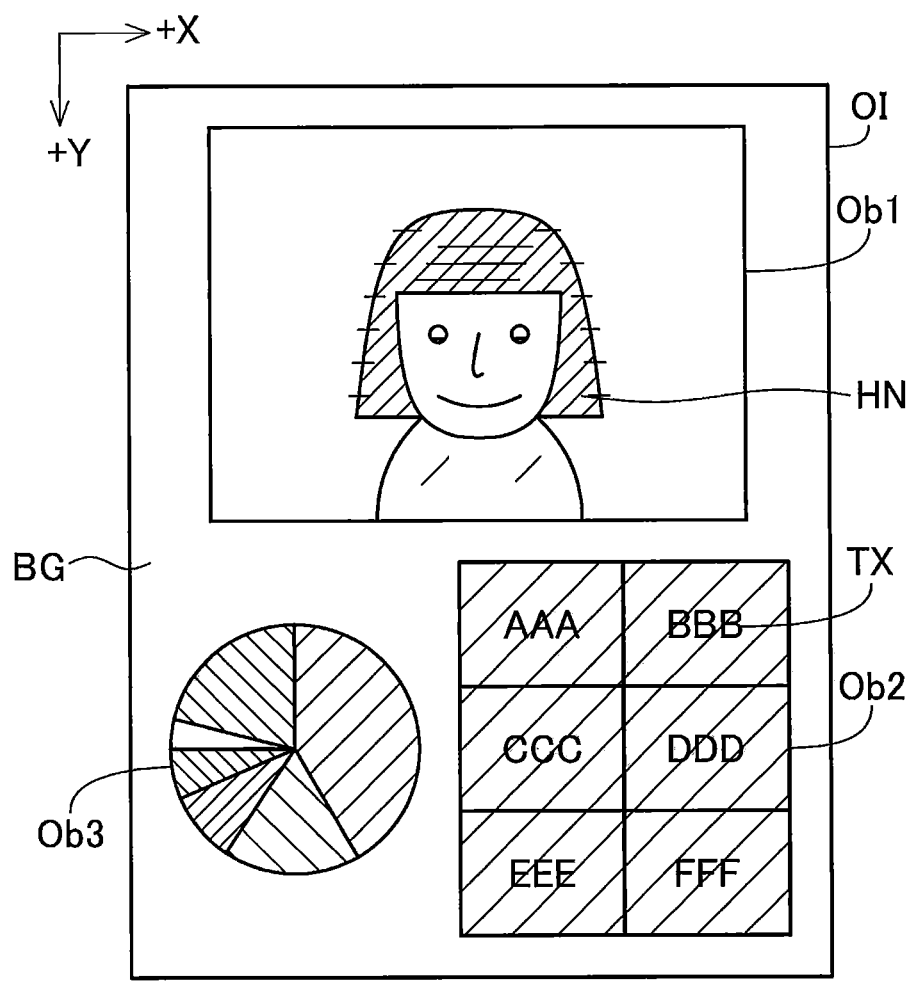
FIG. 3 illustrates a sample target image represented by target image data.

FIG. 3 illustrates a sample target image OI represented by the target image data. The target image OI includes a plurality of pixels arranged in a matrix configuration with rows in the X-direction (the horizontal direction in FIG. 3) and columns in the Y-direction (the vertical direction in FIG. 3). The target image OI in FIG. 3 includes three objects Ob1, Ob2, and Ob3, and a background BG. The object Ob1 represents a photo that includes a human figure HN. The object Ob2 represents a table that includes text TX. The object Ob3 represents a graphic, and specifically a pie chart.

In S30 the CPU 210 executes a region identification process on the target image data. The region identification process is performed to identify regions in which the plurality of objects Ob1 through Ob3 are arranged (hereinafter called object regions) and to identify the attributes of the object in each object region. Object attributes in the present embodiment are one of photo, text, and graphic.

In this region identification process, the CPU 210 applies a well-known edge detection filter to the target image data to extract edges in the target image OI, for example, and identifies regions in which the quantity of edges is greater than a reference as object regions. Of the one or more identified object regions, the CPU 210 identifies regions having characteristics of text as text regions and regions having characteristics of photographs as photo regions. The CPU 210 identifies regions among the one or more identified object regions that do not have characteristics of text or characteristics of photographs as graphic regions. Characteristics of text may be that the number of colors is fewer than a threshold TH1 and that the ratio of object pixels having a color different from the background color is smaller than a threshold TH2, for example. The characteristics of photographs may be that the number of colors is greater than the threshold TH1 and that the ratio of object pixels having a color different from the background pixel is greater than the threshold TH2. Various well-known techniques may be applied to implement the object identification process, such as one of the well-known techniques disclosed in Japanese Patent Application Publications Nos. 2013-030090, H05-225378, and 2002-288589.

In the example of FIG. 3, the CPU 210 identifies the region in which the object Ob1 is arranged as a photo region, the region in which the object Ob2 is arranged as a text region, and the region in which the object Ob3 is arranged as a graphic region.

In S40 the CPU 210 executes a color conversion process on the target image data. Through the color conversion process, the CPU 210 converts RGB values for each pixel in the target image data to color values that include a plurality of component values respectively corresponding to the plurality of colorants used for printing. In the present embodiment, the RGB values are converted to CMYK values. The CMYK values are color values in the CMYK color space that include four component values for the colors cyan (C), magenta (M), yellow (Y), and black (K) (C value, M value, Y value, and K value). Each of the C value, M value, Y value, and K value is a gradation value for one of 256 gradations, for example. The color conversion process is executed by referencing a color conversion profile (not illustrated in the drawings) pre-stored in the nonvolatile storage device 230. The color conversion profile is information specifying correlations between RGB values and CMYK values and specifically is a lookup table.

In S50 and S60 the CPU 210 executes a halftone process on the target image data converted in the color conversion process to generate dot data specifying a dot formation state for each pixel and for each colorant. The dot formation states for pixels included in the dot data may indicate one of the values "large dot," "medium dot," "small dot," and "no dot." Alternatively, the dot formation states for pixels in the dot data may be one of the two values "dot" and "no dot." In the present embodiment, the CPU 210 performs different halftone processes on data within the converted target image data that corresponds to photo regions in the target image OI identified in S30 and data that corresponds to regions other than photo regions (text regions, graphic regions, and background regions in the present embodiment). Dot data is data representing a print image to be printed by the printer 100.

In S50 the CPU 210 executes a halftone process using a machine learning model MM on data corresponding to photo regions in the converted target image data. This halftone process produces dot data for data corresponding to the photo regions. The halftone process using the machine learning model MM will be described later.

In S60 the CPU 210 executes a halftone process according to a dither method using a dither matrix on data corresponding to regions different from photo regions among the converted target image data. This halftone process produces dot data for data corresponding to regions other than photo regions. As a variation, a halftone process according to another method that does not use a machine learning model MM, such as the well-known error diffusion method, may be employed in place of the dither method.

In S70 the CPU 210 generates a print job using the dot data. For example, the CPU 210 executes a process for rearranging the dot data in an order that the printer 100 uses for printing and a process for adding printer control codes and data identification codes to the dot data. As a result, the CPU 210 produces a print job that the printer 100 can interpret. In S80 the CPU 210 transmits the print job generated in S70 to the printer 100. Upon receiving the print job, the printer 100 prints an image based on the print job.

<A-3. Machine Learning Model>

Figure 4A:
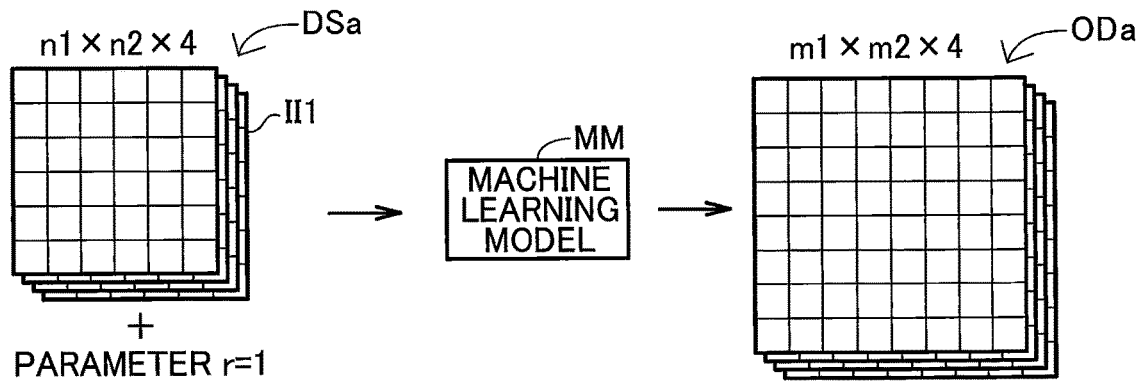
Figure 4B:
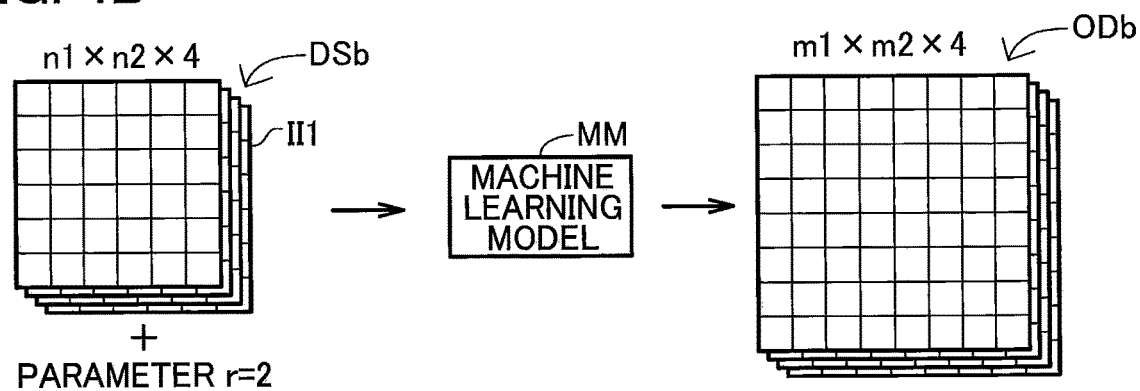
Figure 4C:
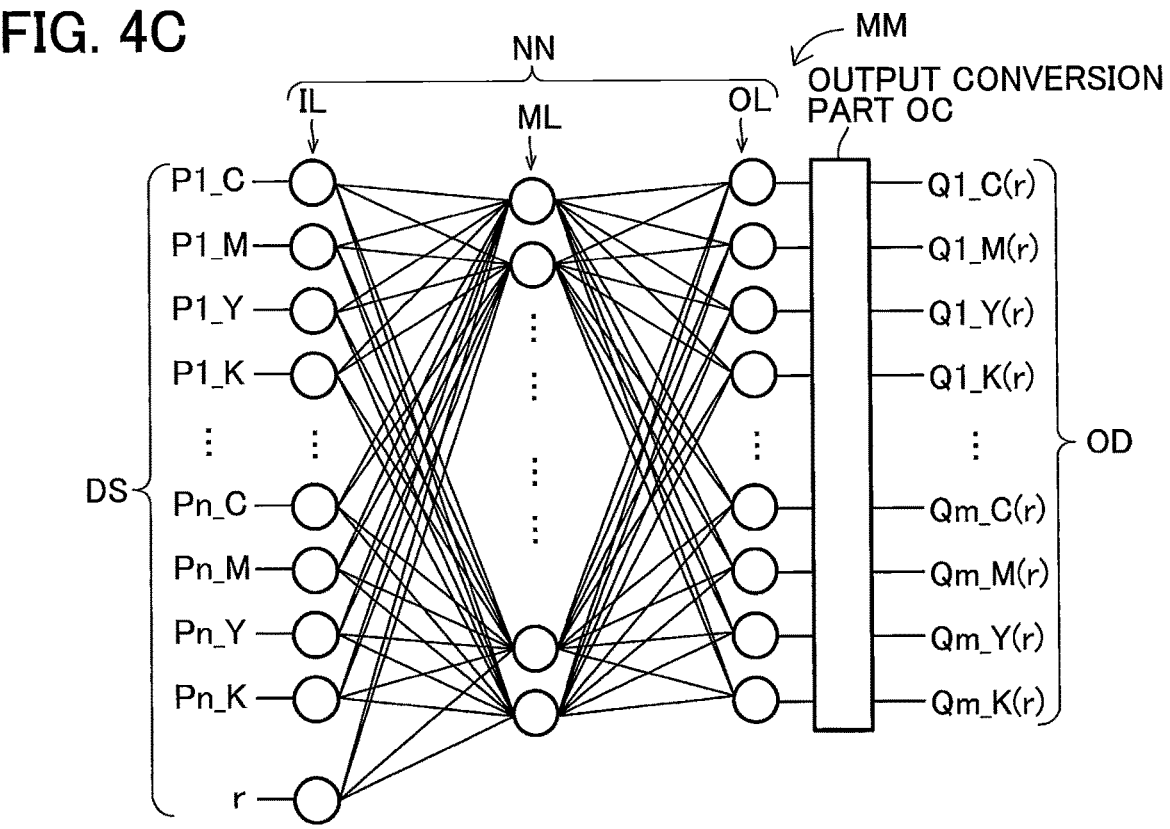

As illustrated in FIG. 1, the computer program PG includes the machine learning model MM as a module. FIGS. 4A through 4C are explanatory diagrams for the machine learning model MM. This machine learning model MM is used in the halftone process of S50 described in FIG. 2. The machine learning model MM is a model using a neural network.

Input to the machine learning model MM is a dataset DS configured of input image data II, and an input parameter r. The input image data II in the present embodiment is CMYK image data having a size of n1 number of pixels vertically by n2 number of pixels horizontally. Numbers n1 and n2 are natural numbers equal to or greater than two. For example, n1=n2=16. To avoid complicating the drawings, each of FIGS. 4A and 4B illustrates an example in which n1=n2=6. The input image data II includes four component values for each pixel since each pixel has the CMYK values described above. That is, since the input image data II includes four layers for C, M, Y, and K, the input image data II includes (n1×n2×4) number of values (see FIGS. 4A and 4B). The input parameter r can take any integer value between 0 and z. Value z may be 10, for example. In this way, a single dataset DS includes {(n1×n2×4)+1} number of values.

The CMYK values for each of the n number of pixels (where n=n1×n2) in the input image data II are given the notation (PI_C, PI_M, PI_Y, PI_K). Each value of (PI_C, PI_M, PI_Y, PI_K) is normalized to a value between 0 and 1. In this notation, I is an identifier identifying one of the n number of pixels and takes an integer between 1 and n.

FIG. 4A illustrates a dataset DSa that includes specific input image data III, and the value "1" as the input parameter r. FIG. 4B illustrates a dataset DSb that includes the specific input image data III, and the value "2" as the input parameter r. In this case, dataset DSa and dataset DSb include common specific input image data III but differing input parameters r.

Output of the machine learning model MM is partial dot data OD having the size m1 number of pixels vertically by m2 number of pixels horizontally. Each outputted pixel includes values for the four CMYK components. In other words, since the partial dot data OD includes four layers for C, M, Y, and K, the partial dot data OD has (m1×m2×4) number of values (see FIGS. 4A and 4B). Each component value indicates one of the four dot formation states "large dot," "medium dot," "small dot," and "no dot." As an example, the values 1, 0.3, 0.1, and 0 may specify the "large dot," "medium dot," "small dot," and "no dot," respectively. These values represent the densities of each dot relative to the density of the large dot, which is set to 1.

Here, the number m1 of pixels in the vertical direction and the number m2 of pixels in the horizontal direction of the output image represented by the partial dot data OD are greater than the corresponding number n1 of pixels in the vertical direction and the number n2 of pixels in the horizontal direction of the input image represented by the input image data II (m1>n1, m2>n2). In the present embodiment, the vertical pixel number m1 and horizontal pixel number m2 in the output image are greater than the corresponding vertical pixel number n1 and horizontal pixel number n2 in the input image by two each (m1=n1+2, m2=n2+2).

The CMYK values for each of m number of pixels in the partial dot data OD (where m=m1×m2) are represented by the notation (Qk_C(r), Qk_M(r), Qk_Y(r), Qk_K(r)). Each value represented by (Qk_C(r), Qk_M(r), Qk_Y(r), Qk_K(r)) is normalized to a value between 0 and 1. Here, k is an identifier that identifies one of the m number of pixels and takes an integer between 1 and m, and r is the input parameter r that takes an integer between 0 and z.

Thus, the machine learning model MM can convert input image data II to partial dot data OD. Here, the machine learning model MM outputs different partial dot data OD when the input parameters r included in two datasets DS are different, even if the input image data II in the two datasets DS is the same data. In the example of FIGS. 4A and 4B, both the dataset DSa in FIG. 4A and the dataset DSb in FIG. 4B include the same specific input image data III, but different input parameters r. Consequently, partial dot data ODa outputted when the dataset DSa is inputted differs from partial dot data ODb outputted when the dataset DSb is inputted. Here, the overall density of an image represented by the partial dot data ODa is equivalent to the overall density of an image represented by the partial dot data ODb, but the layout positions of dots differ.

Next, a sample configuration of the machine learning model MM will be described with reference to FIG. 4C. The machine learning model MM includes a hierarchical neural network NN that is provided with an input layer IL, a middle layer ML, and an output layer OL; and an output conversion part OC. The $\{(n1 \times n2 \times 4)+1\}$ number of values in the dataset DS described above are inputted into the input layer IL as input values. Accordingly, when $N=(n1 \times n2 \times 4)+1$, the input layer IL is provided with N number of neurons. The middle layer ML is provided with L number of neurons, where L is an integer equal to or greater than 2 (1,000-10,000, for example). The output layer OL outputs output values respectively corresponding to the $(m1 \times m2 \times 4)$ number of values in the partial dot data OD described above. Hence, when $M=m1 \times m2 \times 4$, the output layer OL is provided with M number of neurons.

Each of the L number of neurons in the middle layer ML is connected with all neurons in the input layer IL, and a weight is set for each connection. Therefore, a value obtained by adding a bias to the inner product of the vector comprising the N number of input values inputted into the input layer IL and the vector comprising the N number of weights (inner product+bias) becomes the input value for one neuron in the middle layer ML. A value obtained by inputting this input value into an activation function becomes the output value for one neuron in the middle layer ML. Similarly, all M number of neurons in the output layer OL are connected to all neurons in the middle layer ML, and a weight is set for each connection. Therefore, the value obtained by adding a bias to the inner product of the vector comprising the L number of output values outputted from the middle layer ML and the vector comprising the L number of weights (inner product+bias) becomes the input value for one neuron in the output layer OL. The value obtained by inputting this input value into an activation function becomes the output value for one neuron in the output layer OL. Each output value is a value between 0 and 1. Accordingly, M number of output values are outputted from the output layer OL. The $\{(N \times L)+(L \times M)\}$ number of weights and the $(L+M)$ number of biases used in the above calculations are operation parameters adjusted through a training process described later. The above-stated neural network NN and learning algorithm thereof are disclosed in Rumelhart, D. E., Hinton, G. E. and Williams, R. J. (1986), Learning representations by back-propagating errors, Nature, Vol. 323, No. 9, pages 533-536.

Figure 5:
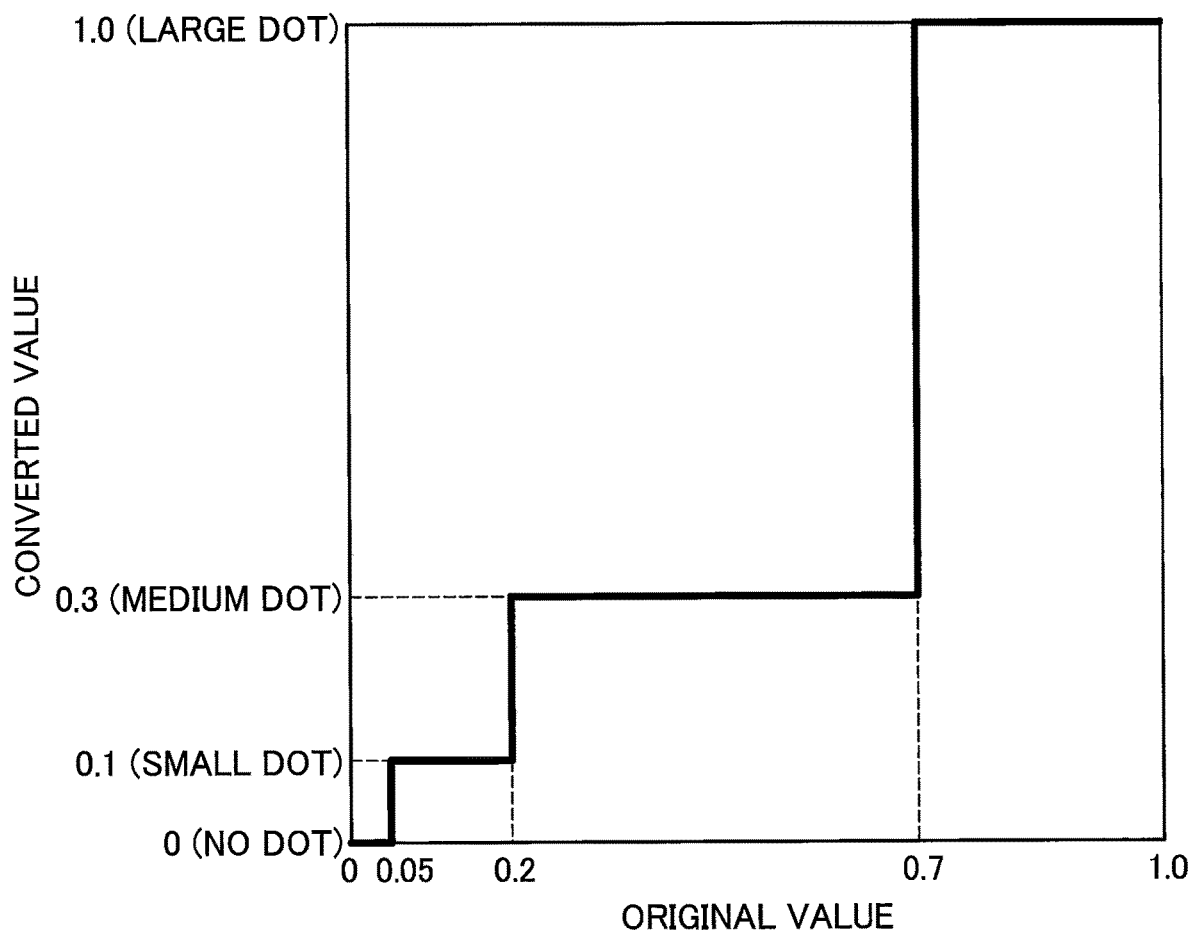
FIG. 5 is a graph showing correlations between original values prior to conversion and converted values converted by an output conversion part of the machine learning model.

The output conversion part OC converts each of the output values between 0 and 1 outputted from the M number of neurons in the output layer OL to one of the values (1, 0.3, 0.1, 0) indicating a "large dot," "medium dot," "small dot," and "no dot," respectively, as described above. FIG. 5 is a graph showing correlations between the original values prior to conversion and the converted values. As illustrated in FIG. 5, the output conversion part OC converts output values within the range between 0 and 0.05 to the value "0" corresponding to "no dot"; converts output values within the range between 0.05 and 0.2 to the value "0.1" corresponding to "small dot"; converts output values within the range between 0.2 and 0.7 to the value "0.3" corresponding to "medium dot"; and converts output values within the range between 0.7 and 1.0 to the value "1" corresponding to "large dot." As a result, each value in the partial dot data OD described above is outputted.

<A-4. Halftone Process Using the Machine Learning Model MM>

Figure 6:
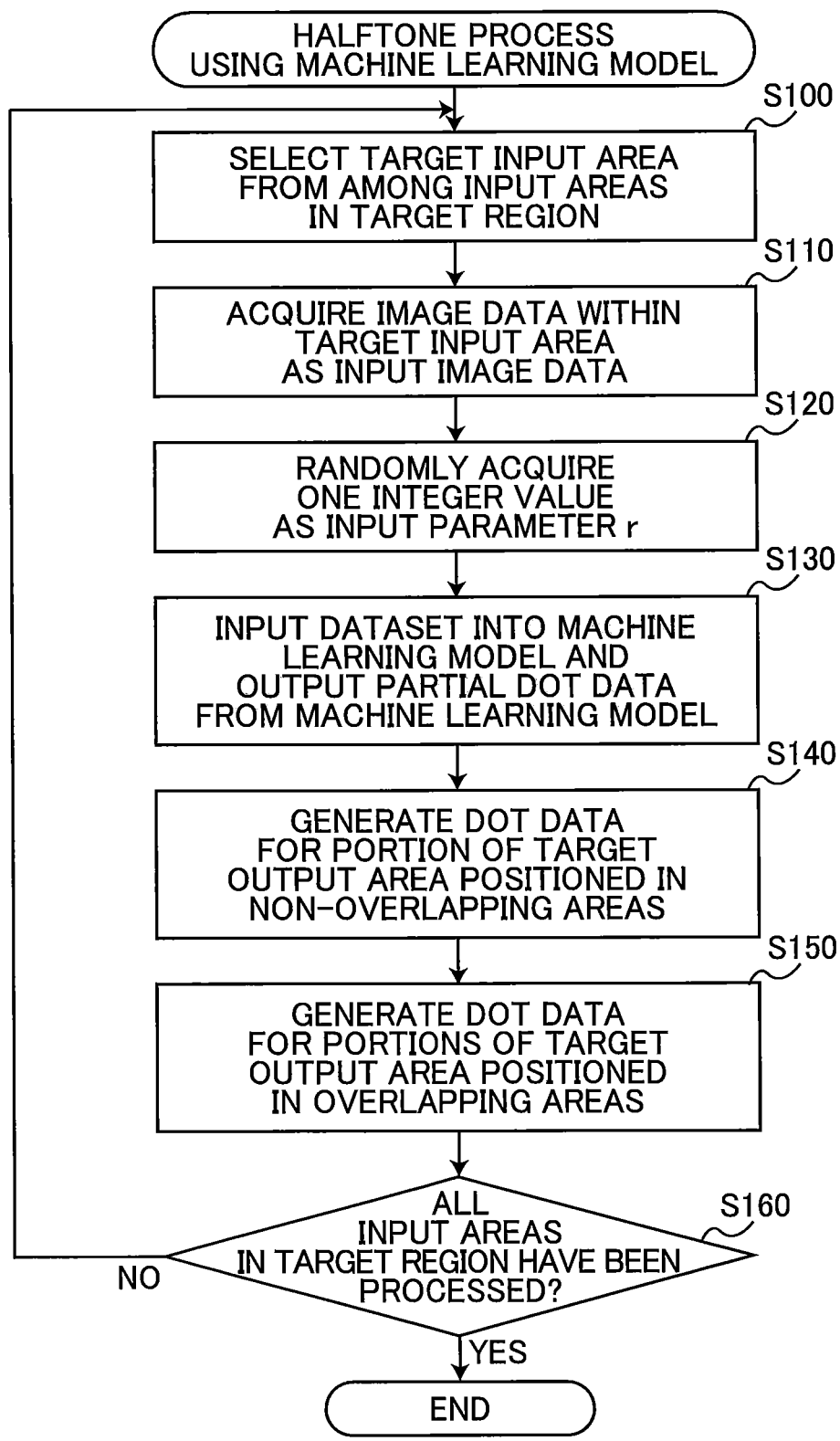
FIG. 6 is a flowchart illustrating steps in a halftone process using the machine learning model performed by the CPU executing the computer program in the terminal device according to the embodiment of the present disclosure.

Next, the halftone process in S50 of FIG. 2 will be described. FIG. 6 is a flowchart illustrating steps in the halftone process using the machine learning model MM.

Figure 7A:
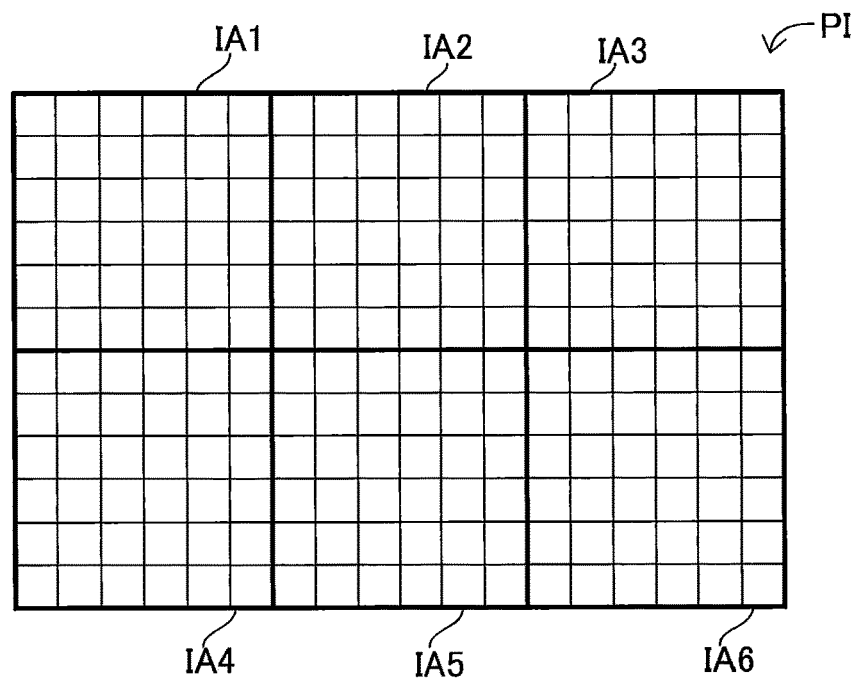
FIG. 7A illustrates a sample target region in a target image, where the target region includes six input areas.
Figure 7B:
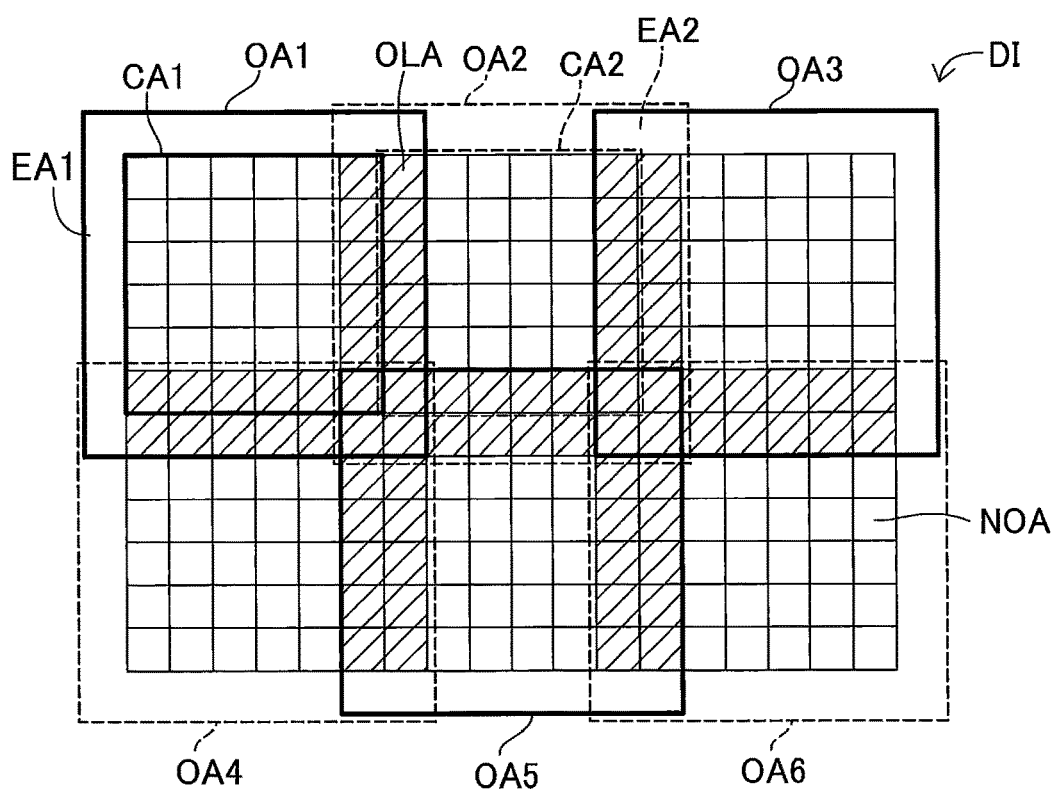
FIG. 7B illustrates a sample corresponding region in a dot image that corresponds to the target region in FIG. 7A, where the corresponding region includes six output areas.

FIGS. 7A and 7B illustrate a sample target region PI and a sample corresponding region DI, respectively.

FIG. 7A illustrates a target region PI in the target image OI that is the target of the halftone process in S50 (a photo region in this example). FIG. 7B illustrates a corresponding region DI in a dot image (not illustrated) represented by dot data generated in the halftone processes of S50 and S60 that corresponds to the target region PI. The corresponding region DI has the same size (number of pixels in the vertical and horizontal directions) as the target region PI. Each of the plurality of squares included in the target region PI and the corresponding region DI represents one pixel. Although the target region PI and the corresponding region DI each have four layers for colors C, M, Y, and K, only one layer is depicted in FIGS. 7A and 7B. Accordingly, the halftone process is executed on each of the four layers. However, the process for each layer is similar and performed independently from the others. Accordingly, the following description will focus on one layer (the cyan layer in this example).

In S100 the CPU 210 selects one of a plurality of input areas set in the target region PI (a photo region in this example) to be the target input area. Specifically, the CPU 210 divides the target region PI into a plurality of input areas IA and selects each of the input areas IA sequentially one at a time to be the target input area. In the example of FIG. 7A, the target region PI has been divided into six input areas IA1 through IA6. The six input areas IA1 through IA6 may be selected to be the target input area in order of the ending number in their reference characters. Each input area IA is equivalent in size to the input image data II of the machine learning model MM described above, i.e., n1 number of pixels vertically by n2 number of pixels horizontally ($n1=n2=6$ in the example of FIG. 7A).

In S110 the CPU 210 acquires image data from the color-converted target image data (CMYK image data) within the target input area as the input image data II. In S120 the CPU 210 randomly acquires one integer value between 0 and z to be the input parameter r.

In S130 the CPU 210 inputs a dataset DS that includes the input image data II acquired in S110 and the input parameter r acquired in S120 into the machine learning model MM, thereby causing the machine learning model MM to output the partial dot data OD. In the following description, the partial dot data OD outputted from the machine learning model MM will be called partial dot data ODs when the inputted dataset DS includes image data in one of the six input areas IAs of FIG. 7A (where s is an integer between 1 and 6) as the input image data II.

In S140 and S150 the CPU 210 uses the partial dot data OD to generate dot data in the target output area of the dot data being generated. The target output area will be called an output area OAs when the target input area is the input area IAs in FIG. 7A (where s is an integer between 1 and 6). FIG. 7B illustrates output areas OA1 through OA6. Since each output area OAs has a size corresponding to the partial dot data ODs, the output area OAs is larger than the input area IAs by two pixels vertically and two pixels horizontally, as described above. Consequently, the output area OAs includes a central area CAs corresponding to the input area IAs and an edge area EAs adjacent to the outside of the central area CAs. To avoid complicating the diagram, only a central area CA1 and an edge area EA1 of the output area OA1 and a central area CA2 and an edge area EA2 of the output area OA2 are depicted in FIG. 7B.

Part of the edge area EAs corresponds to a separate input area adjacent to the input area IAs. For example, the right-side portion of the edge area EA1 in FIG. 7B corresponds to the left-side portion of the input area IA2 (see FIG. 7A) adjacent to the input area IA1. Hence, the output areas OA1 and OA2 in the corresponding region DI overlap each other in the portion corresponding to the border between the input areas IA1 and IA2 in the target region PI, as shown in FIG. 7B. The output areas OA1 and OA2 do not overlap each other in portions corresponding to the central areas of the input areas IA1 and IA2. Therefore, the corresponding region DI includes overlapping areas OLA at which two or more output areas OAs (the output areas OA1 and OA2, for example) overlap, and non-overlapping areas NOA in which two or more output areas OAs do not overlap. The shaded areas in FIG. 7B indicate overlapping areas OLA, while non-shaded areas are non-overlapping areas NOA.

Figure 8A:
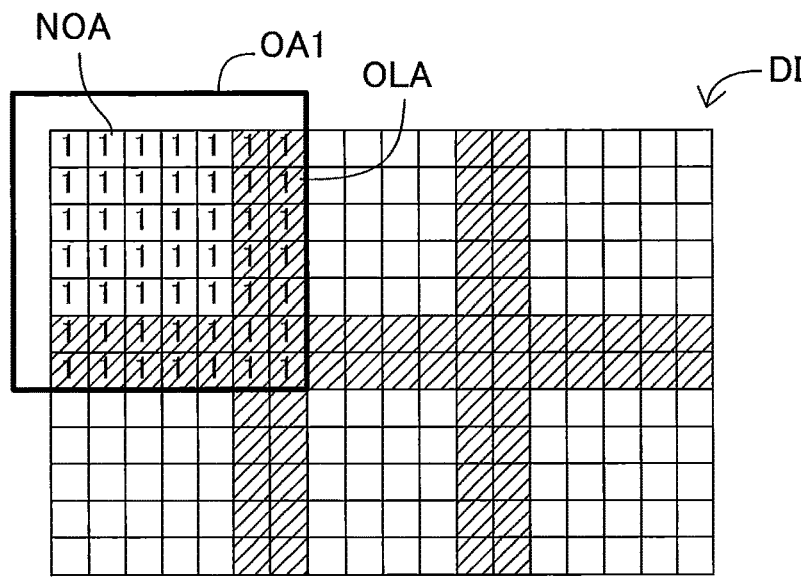
Figure 8B:
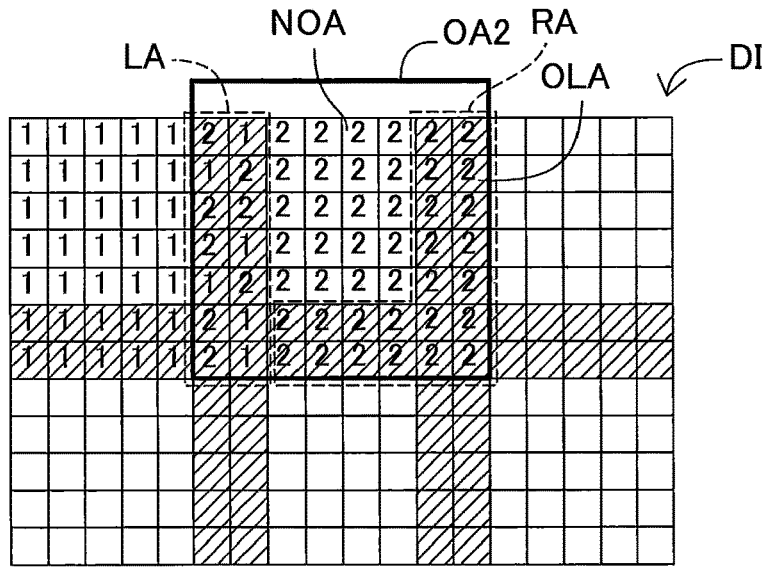
Figure 8C:
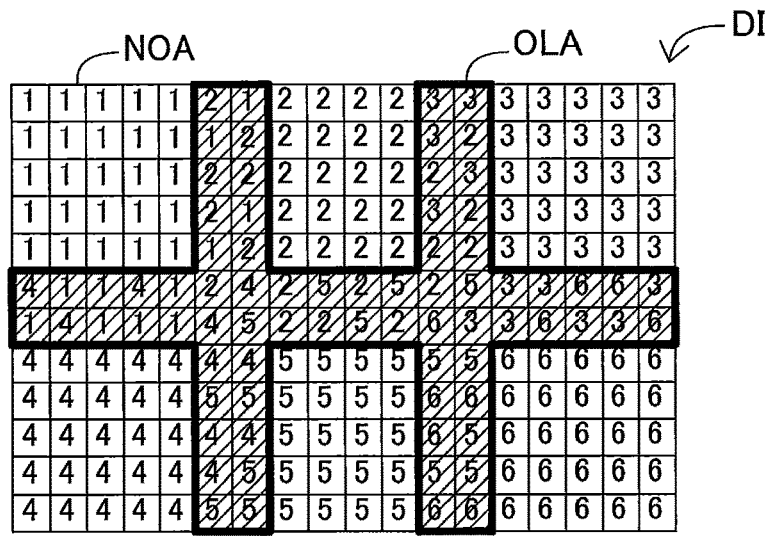

In S140 the CPU 210 generates dot data for the portion of the target output area positioned in the non-overlapping areas NOA. FIGS. 8A through 8C are explanatory diagrams illustrating the generation of dot data. In FIGS. 8A through 8C, the value "s" in each pixel (where "s" is an integer between 1 and 6) signifies that the value of the pixel is the value in the partial dot data ODs. FIGS. 8A and 8B illustrate an example in which the target output area is the output area OA1 and output area OA2, respectively. FIG. 8C illustrates the result of generating all dot data for the corresponding region DI. As illustrated in FIGS. 8A through 8C, the value of each pixel in the output area OAs at positions in the non-overlapping area NOA is the value of the corresponding pixel in the partial dot data ODs when the target output area is the output area OAs. For example, values in the partial dot data OD1 are applied to the values of the plurality of pixels in the portion of the output area OA1 positioned within the non-overlapping area NOA, while values in the partial dot data OD2 are applied to values in the plurality of pixels included in the portion of the output area OA2 positioned in the non-overlapping area NOA.

In S150 the CPU 210 generates dot data for the portions of the target output area positioned in the overlapping areas OLA. Specifically, the value for each pixel in portions positioned in the overlapping areas OLA for which dot data has not yet been generated is set to the value of the corresponding pixel in the partial dot data ODs when the target output area is the output area OAs. Subsequently, values for some of the pixels in portions having dot data already generated at this time are maintained at their generated values while values for the remaining pixels are respectively replaced with the values of corresponding pixels in the partial dot data ODs. Pixels maintained at their original value and pixels that are replaced are selected randomly at a probability of 1/2, for example.

For example, since dot data has not yet been generated in the portions of the output area OA1 positioned within the overlapping areas OLA at the timing of FIG. 8A, the values of all pixels in this portion are set to the values in the partial dot data OD1. However, at the timing of FIG. 8B, dot data has not yet been generated in a right-side portion RA of the output area OA2 positioned in the overlapping area OLA, but has been generated in a left-side portion LA. Accordingly, the value of each pixel in the right-side portion RA is set to the value in the partial dot data OD2. However, the values of some pixels in the left-side portion LA are maintained at the values in the partial dot data OD1, while the values of the remaining pixels in the left-side portion LA are replaced with the values in the partial dot data OD2.

In S160 the CPU 210 determines whether all of the input areas IA1 through IA6 in the target region PI have been processed as the target input area. When all input areas have been processed (S160: YES), the CPU 210 ends the halftone process using the machine learning model MM. However, if there remain unprocessed input areas (S160: NO), the CPU 210 returns to S100.

According to the image process described above (see FIG. 2), the CPU 210 functioning as the (a) acquiring acquires RGB image data as the target image (S10 and S20 of FIG. 2). As the (b) generating, the CPU 210 generates dot data using the RGB image data (S40 through S60 of FIG. 2). Subsequently by inputting partial image data corresponding to the input area IA1 and a first value (1, for example) as the input parameter r into the machine learning model MM, the CPU 210 serving as the (b1) inputting causes the machine learning model MM to output the partial dot data OD1 (S130 of FIG. 6) specifying dot formation states in the output area OA1 (see FIG. 7B) that includes the central area CA1 corresponding to the input area IA1 (see FIG. 7A). Next, by inputting partial image data corresponding to the input area IA2, which is a portion different from the input area IA1, and a second value (2, for example) as the input parameter r into the machine learning model MM, the CPU 210 serving as the (b2) inputting causes the machine learning model MM to output the partial dot data OD2 (S130 of FIG. 6) specifying dot formation states in the output area OA2 (see FIG. 7B) that includes the central area CA2 corresponding to the input area IA2 (see FIG. 7A). Still functioning as the (b3) generating, the CPU 210 uses the partial dot data OD1 and partial dot data OD2 to generate dot data (S140 and S150 of FIG. 6, FIGS. 8A and 8B). As described above with reference to FIGS. 4A through 4C, the machine learning model MM outputs partial dot data OD2 that is different from the partial dot data OD1 based on a different input parameter r, even though the partial image data corresponding to the input area IA1 is identical to the partial image data corresponding to the input area IA2. This process can suppress the appearance of periodicity in an image represented by the dot data (the corresponding region DI in FIG. 8C, for example) that did not exist in the target image (the target region PI in FIG. 7A, for example), thereby improving the quality of the images printed using dot data.

If partial image data corresponding to the input area IA1 in the target region PI (see FIG. 7A) were identical to the partial image data corresponding to the input area IA2, the machine learning model MM would output partial dot data OD2 that is identical to the partial dot data OD1. In this case, periodicity not present in the target region PI would appear in the corresponding region DI since the same dot pattern is repeated in the corresponding region DI (see FIG. 8B). Such periodicity may cause periodic patterns called moiré patterns (interference fringes), for example, to appear in the corresponding region DI. The image process of the present embodiment can suppress the occurrence of such problems.

According to the image process described above, the input area IA2 is part of the target region PI adjacent to the input area IA1. The output area OA1 (see FIG. 7B) includes the central area CA1 in the corresponding region DI corresponding to the input area IA1, and an area in the corresponding region DI corresponding to part of the input area IA2 (a partial area of the edge area EA1). The output area OA2 (see FIG. 7B) includes the central area CA2 corresponding to the input area IA2, and an area corresponding to part of the input area IA1 (a partial area of the edge area EA2). The output area OA1 and output area OA2 overlap each other in a part corresponding to the border between the input area IA1 and input area IA2 (see FIG. 7B). Dot data is then generated using the partial dot data OD1 and OD2 specifying dot formation states in the overlapping output areas IA1 and OA2. This process can suppress the appearance of false contouring (block-noise, for example) in the portion of the image represented by dot data (the corresponding region DI, for example) corresponding to the border between the input area IA1 and input area IA2, thereby improving the quality of images printed using dot data. If no overlapping area existed between the output area OA1 and output area OA2, the border between the image represented by the partial dot data OD1 and the image represented by the partial dot data OD2 would be a single line, and the problem of false contouring is more likely to occur in this line than in the image process of the embodiment.

According to the image process described above, the CPU 210 serving as the (b3) generating generates dot data by setting the values of first pixels in the overlapping area of the dot data in which the output areas OA1 and OA2 overlap (the left-side portion LA in FIG. 8B) to the values of corresponding pixels in the partial dot data OD1 and setting the values of second pixels to the values of corresponding pixels in the partial dot data OD2 (FIG. 8B, S150 of FIG. 6). This configuration can suitably suppress the appearance of false contouring in the area corresponding to the border between the output areas OA1 and OA2 since the dot data in the overlapping area is generated using values for pixels in the partial dot data OD1 and values for pixels in the partial dot data OD2.

According to the image process described above, the first pixels that take on values in the partial dot data OD1 and the second pixels that take on values in the partial dot data OD2 are randomly selected from among the plurality of pixels in the overlapping area (the left-side portion LA, for example), thereby effectively suppressing the appearance of false contouring in the overlapping area. If the first pixels and second pixels were to be selected in regular or periodic patterns, a regularity or periodicity would appear in the corresponding region DI. However, the present embodiment can suppress the occurrence of these problems.

In the image process described above, the CPU 210 serving as the (c) identifying identifies photo regions that include photographs and non-photo regions that include text or graphics (S30 of FIG. 2). As the (b) executing, the CPU 210 executes the halftone process of FIG. 6 on data corresponding to photo regions (S50 of FIG. 2). In other words, the CPU 210 controls the machine learning model MM to output the partial dot data OD1 and OD2 corresponding to photo regions and generates dot data for photo regions using the partial dot data OD1 and OD2. Subsequently, the CPU 210 serving as the (d) executing executes a halftone process according to the dither method on data in the target image data corresponding to non-photo regions that include text or graphics, without using the machine learning model MM, thereby generating dot data for these regions (S60 of FIG. 2). False contouring and periodicity are easily noticeable in relatively uniform regions and less noticeable in relatively non-uniform regions (regions that include well-defined edges, for example). Accordingly, false contouring and periodicity are more noticeable in photo regions than in text or graphic regions. Further, a halftone process using the machine learning model MM can weaken edges in text and graphics, potentially reducing the legibility of those text and graphics. However, the present embodiment can suitably suppress a drop in image quality in regions where false contouring and periodicity are less noticeable, while improving image quality in photo regions where false contouring and periodicity are more noticeable.

<A-5. Training Process for the Machine Learning Model MM>

Next, the training process for the machine learning model MM will be described. A training process is a process of training the machine learning model MM by adjusting the operation parameters described above (weights and biases) in order that the machine learning model MM can output suitable partial dot data OD. The machine learning model MM described above incorporated in the computer program PG that is stored in the nonvolatile storage device 230 has already undergone this training process.

Figure 9:
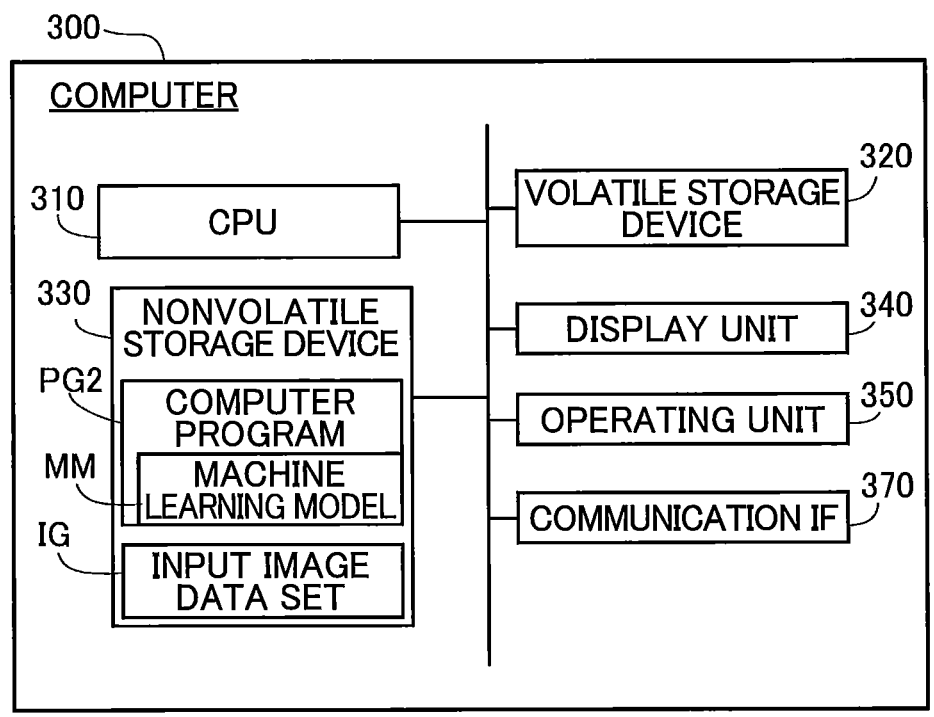
FIG. 9 is a block diagram of a computer that executes a training process of the machine learning model.

FIG. 9 is a block diagram of a computer 300 that executes the training process. The computer 300 may be a personal computer or a server used by the manufacturer of the printer 100 (see FIG. 1), for example. The computer 300 is provided with a CPU 310 serving as the controller of the computer 300; a volatile storage device 320, such as a RAM; a nonvolatile storage device 330, such as a hard disk drive or a flash memory; a display unit 340, such as a liquid crystal display; an operating unit 350, such as a keyboard, mouse, and the like; and a communication interface 370.

The volatile storage device 320 provides a buffer area for temporarily storing various intermediate data generated when the CPU 310 performs processes. The nonvolatile storage device 330 stores a computer program PG2.

The computer program PG2 may be provided in a format that is downloadable from a server operated by the manufacturer of the printer 100, for example. Alternatively, the computer program PG2 may be provided in a format stored on a DVD-ROM or the like. By executing the computer program PG2, the CPU 310 executes the training process. The untrained machine learning model MM is included in the computer program PG2 as a module and has a plurality of operation parameters (weights and biases) set to initial values.

Figure 10:
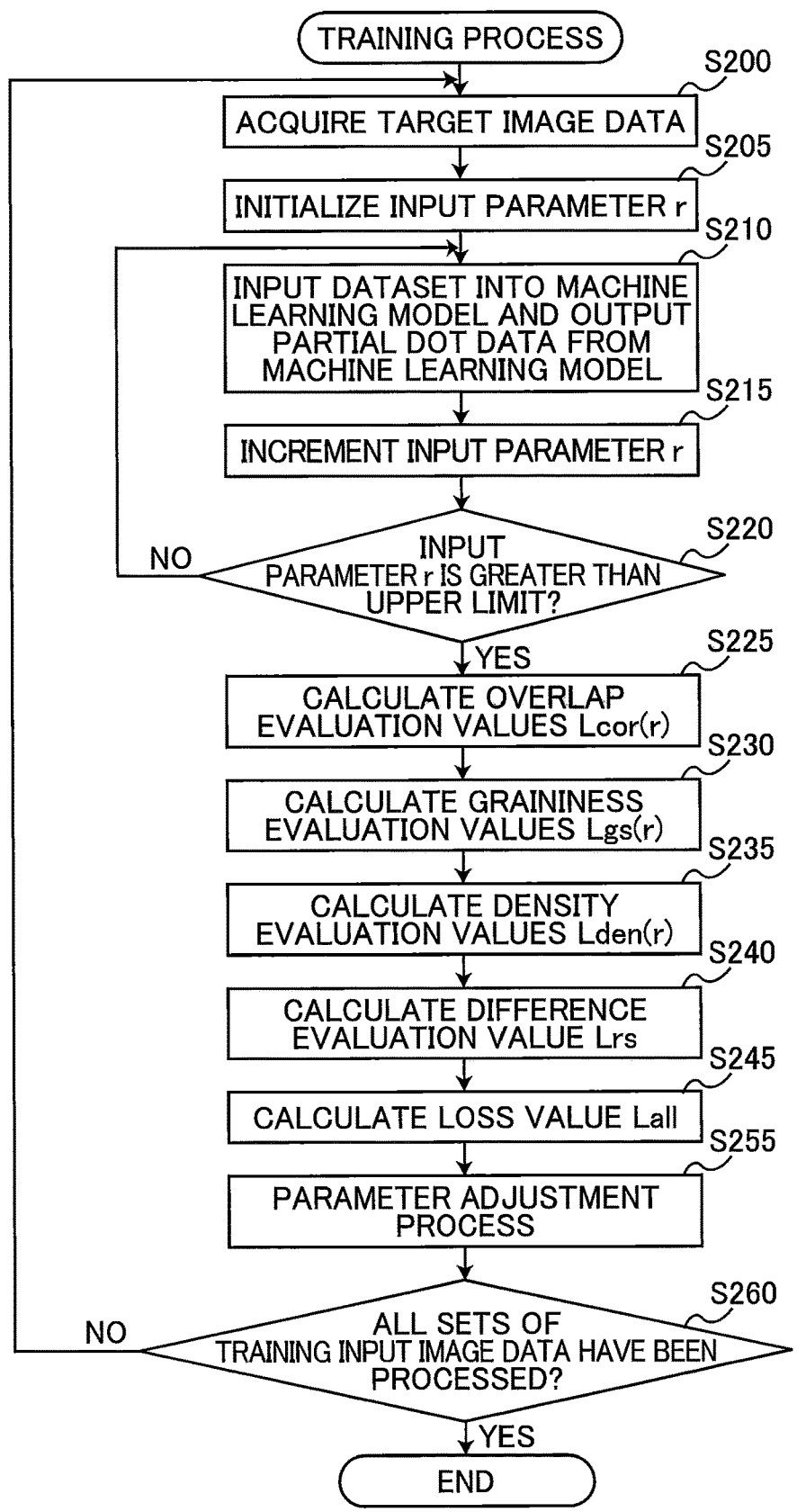
FIG. 10 is a flowchart illustrating steps in the training process performed by a CPU executing a computer program in the computer.

FIG. 10 is a flowchart illustrating steps in the training process. Prior to the training process, the manufacturer prepares an input image data set IG that includes input image data II for training (training input image data II). The training input image data II represents a plurality of input images and may be considered to be samples of partial image data used as the input image data II in the image process of FIG. 2 described above. The input image data set IG includes training input image data II for all possible patterns of CMYK values in n number of pixels. The quantity of training input image data II for all patterns is enormous owing to the size of the input image data II (pixel number n) and the number of gradations for each of the CMYK components (256 gradations, for example). Accordingly, performing the training process with the entire set of training input image data II may be unrealistic. In such a case, the input image data set IG may include only some of the image data selected from the input image data II for all patterns, for example. The prepared input image data set IG is stored in the nonvolatile storage device 330 (see FIG. 9).

In S200 of FIG. 10, the CPU 310 acquires target image data for one image from the input image data set IG stored in the nonvolatile storage device 330. The CPU 310 stores the target image data acquired in S200 in the buffer area of the volatile storage device 320. The CMYK values for each of the n number of pixels in the target image data are given the notation (PI_C, PI_M, PI_Y, PI_K). Here, I is an identifier identifying one of the n number of pixels and takes on an integer value between 1 and n.

In S205 the CPU 310 initializes the input parameter r. In the present embodiment, the CPU 310 sets the input parameter r to 1.

In S210 the CPU 310 inputs a dataset DS that includes the target image data and the input parameter r into the machine learning model MM. Through this action, the CPU 310 directs the machine learning model MM to output partial dot data OD(r). The CPU 310 stores the outputted partial dot data OD(r) in the volatile storage device 320.

In S215 the CPU 310 increments the input parameter r by one. In other words, the CPU 310 adds "1" to the input parameter r. In S220 the CPU 310 determines whether the input parameter r is greater than an upper limit for the input parameter r. Since the input parameter r can take on any integer between 1 and z, the upper limit is z.

If the input parameter r is less than or equal to the upper limit (S220: NO), the CPU 310 returns to S210. However, if the input parameter r is greater than the upper limit (S220: YES), the CPU 310 advances to S225. By the time the process has advanced to S225, z number of sets of partial dot data OD(r) for the z number of input parameters r between 1 and z have been stored in the volatile storage device 320. The notation (Qk_C(r), Qk_M(r), Qk_Y(r), Qk_K(r)) is used for the CMYK values in each of the m number of pixels for one set of partial dot data OD(r). Here, k is an identifier that identifies one of the m number of pixels and takes on an integer value between 1 and m.

In S225 the CPU 310 calculates an overlap evaluation value Lcor(r) for each of the z number of sets of partial dot data OD(r). The overlap evaluation value Lcor(r) is calculated using the following equation (1).

$$Lcor(r) = \frac{1}{m}\sum_{k=1}^{m} OQ(k) \qquad (1)$$

Here, OQ(k) takes the value "1" when dots for two or more of the CMYK colors are to be formed at the k-th pixel in one set of partial dot data OD(r) and takes the value "0" when a dot for only one of the CMYK colors or when no dot is to be formed at the k-th pixel. That is, OQ(k) is set to "1" when the CMYK values (Qk_C(r), Qk_M(r), Qk_Y(r), Qk_K(r)) for the k-th pixel indicate dots are to be formed for two or more colors. OQ(k) is set to "0" when the CMYK values at the k-th pixel indicate the formation of a dot for only one color or indicate that no dot is to be formed. Hence, an OQ(k) of "1" signifies that two or more dots overlap at the k-th pixel, while an OQ(k) of "0" signifies that dots do not overlap at the k-th pixel.

As is clear from the above description and equation (1), the overlap evaluation value Lcor(r) is an evaluation value specifying the percentage of overlapped pixels having two or more dots as a value in the range between 0 and 1.

In S230 the CPU 310 calculates a graininess evaluation value Lgs(r) for each of the z number of sets of partial dot data OD(r). The graininess evaluation value Lgs(r) is calculated using the following equation (2).

$$Lgs(r) = A \times G[OD(r)] \qquad (2)$$

Here, G{OD(r)} is an evaluation value representing the graininess of the image represented by the OD(r). A well-known function may be employed to calculate graininess for the G{OD(r)}. For example, G{OD(r)} may be a function that uses root mean square (RMS) to calculate RMS granularity indicating the fluctuations in image density (values of each pixel). Alternatively, G{OD(r)} may be the Dooley and Shaw evaluation formula that uses a Wiener spectrum and a visual transfer function (VTF). The VTF is a function representing the visual spatial frequency. In the equation, A is a coefficient for normalizing the G{OD(r)} to a value in the range between 0 and 1. As is clear from the above description and equation (2), the graininess evaluation value Lgs(r) is an evaluation value representing graininess as a value in the range between 0 and 1.

In S235 the CPU 310 calculates a density evaluation value Lden(r) for each of the z number of sets of partial dot data OD(r). The density evaluation value Lden(r) is calculated using the following equation (3).

$$Lden(r) = \qquad (3)$$
$$\frac{1}{4m}\sum_{k=1}^{m} SQRT\,[\{AveC - Qk\_C(r)\}^2 + \{AveM - Qk\_M(r)\}^2 +$$
$$\{AveY - Qk\_Y(r)\}^2 + \{AveK - Qk\_K(r)\}^2]$$

Here, AveC is the average C component value (PI_C) for the n number of pixels in the target image data (the training input image data II), and SQRT[V] denotes the square root of V. Similarly, AveM, AveY, and AveK denote the average values of the corresponding M component values (PI_M), Y component values (PI_Y), and K component values (PI_K) for the n number of pixels in the target image data. The density evaluation value Lden(r) is an evaluation value that represents the difference in the density of the image represented by the partial dot data OD(r) and the density of the image represented by the target image data as a value in the range between 0 and 1.

In S240 the CPU 310 calculates a single difference evaluation value Lrs for the z number of sets of partial dot data OD(r). The difference evaluation value Lrs is calculated using the following equations (4) and (5).

$$Lrs = \frac{1}{z^2}\sum_{i=1}^{z}\sum_{j=1}^{z} D\{OD(i), OD(j)\} \qquad (4)$$

$$D\{OD(i), OD(j)\} = \qquad (5)$$
$$\frac{1}{4m}\sum_{k=1}^{m} \{|Qk\_C(i) - Qk\_C(j)| + |Qk\_M(i) - Qk\_M(j)| +$$
$$|Qk\_Y(i) - Qk\_Y(j)| + |Qk\_K(i) - Qk\_K(j)|\}$$

Here, i and j denote a combination of two input parameters r taking any values within the range between 1 and z. D{OD(i), OD(j)} is an evaluation value specifying the average difference between CMYK values for each pixel in the partial dot data OD(i) and CMYK values for each corresponding pixel in the partial dot data OD(j) as a value in the range between 0 and 1.

In S245 the CPU 310 calculates a loss value Lall as a single definitive evaluation value for the z number of sets of partial dot data OD(r). The loss value Lall is calculated by inputting the overlap evaluation value Lcor(r), graininess evaluation value Lgs(r), density evaluation value Lden(r), and difference evaluation value Lrs calculated in steps S225 through S240 into equation (6) below. The function represented in equation (6) will be called a loss function.

$$Lall = (1 - Lrs) + \frac{1}{z}\sum_{r=1}^{z} Lcor(r) + \frac{1}{z}\sum_{r=1}^{z} Lgs(r) + \frac{1}{z}\sum_{r=1}^{z} Lden(r) \qquad (6)$$

In S255 the CPU 310 executes a parameter adjustment process. The parameter adjustment process is performed to adjust the operation parameters described above (weights and biases) used in the machine learning model MM. Specifically, the CPU 310 adjusts the operation parameters according to a prescribed algorithm to reduce the loss value Lall. For example, the prescribed algorithm may be an algorithm using a backpropagation method and a gradient descent method.

In S260 the CPU 310 determines whether all sets of training input image data II included in the input image data set IG have been processed as the target image data. When all sets of training input image data II have been processed (S260: YES), the CPU 210 ends the training process. If there remain unprocessed sets of training input image data II (S260: NO), the CPU 210 returns to S200. Note that the training process may be repeatedly performed a prescribed number of times if the outputted partial dot data OD is not sufficiently suitable in one training process.

Upon completion of the training process described above, the machine learning model MM is a trained model whose operation parameters have been adjusted. Accordingly, the training process may be considered a process for generating (producing) a trained model.

According to the training process described above, the CPU 310 acquires z number of datasets DS that include training input image data II, and a single input parameter r selected from among integer values between 1 and z (S200, S205, and S215 of FIG. 10). The CPU 310 inputs the z number of datasets DS into the machine learning model MM, causing the machine learning model MM to output z number of sets of partial dot data OD(r) respectively corresponding to the z number of datasets DS (S210 of FIG. 10). The CPU 310 uses the z number of sets of partial dot data OD(r) to adjust the plurality of operation parameters used in operations performed by the machine learning model MM (S255 of FIG. 10).

In S255 the CPU 310 adjusts the operation parameters so that partial dot data OD(1) corresponding to the dataset DS that includes a specific input image data II and "1" as the input parameter r and partial dot data OD(2) corresponding to the dataset DS that includes the input image data II and "2" as the input parameter r are different data. Thus, a trained model that has undergone the training process described above (the machine learning model MM) outputs partial dot data that differs for different input parameters r, even if the image data in the inputted datasets DS is the same. As a result, the trained model can be used to suppress the occurrence of periodicity in an image represented by dot data generated in the image process described above when the periodic patterns were not present in the target image OI. Accordingly, use of the trained model to generate dot data can improve the quality of the image printed using the dot data.

More specifically, in S255 the CPU 310 adjusts the operation parameters using the z number of sets of partial dot data OD(r) to produce a smaller loss value Lall calculated according to the loss function in equation (6). The loss function of equation (6) includes a first term (1−Lrs) that is smaller for larger differences between two sets of partial dot data among the z number of sets of partial dot data OD(r), e.g., the difference between the partial dot data OD(1) and partial dot data OD(2). Thus, the CPU 310 adjusts the operation parameters in order to increase the difference between the partial dot data OD(1) and partial dot data OD(2). This action can further suppress the problem of periodicity not present in the target image OI from appearing in the image represented by dot data generated using the trained model. Accordingly, this type of problem can be suppressed in a printed image by generating dot data using a trained model that has undergone the training process described above.

In the training process described above, the loss function of equation (6) includes a second term that grows larger when there is a larger number of CMYK values (pixel data) in the partial dot data OD(r) specifying the formation of two or more types of dots (dots of two or more colors), and specifically the second term in equation (6) that includes the overlap evaluation value Lcor(r). Thus, the loss function can suppress overlap among dots in different CMYK layers in the outputted partial dot data OD(r). If there is an excessively large amount of overlap among dots between the CMYK layers, the color of an image represented by the partial dot data OD(r) may differ from the color of the image represented by the input image data II. However, this type of problem can be suppressed in the printed image by generating dot data using a trained model that has undergone the training process described above.

In the training process described above, the loss function of equation (6) also includes a third term that is larger when the image represented by the partial dot data OD(r) has greater graininess, and specifically the third term in equation (6) that includes the graininess evaluation value Lgs(r). Thus, the loss function can suppress an increase in graininess in the image represented by the partial dot data OD(r). Excessively high graininess in an image may cause deterioration in the appearance of the image. However, this type of problem can be suppressed in the printed image by generating dot data using a trained model that has undergone the training process described above.

According to the training process described above, the loss function of equation (6) also includes a fourth term that grows smaller as the density of the image represented by the partial dot data OD(r) approaches the density of the image represented by the corresponding input image data II in the dataset DS, and specifically the fourth term in equation (6) that includes the density evaluation value Lden(r). Thus, the CPU 310 can cause the trained model to output partial dot data OD(r) capable of properly representing the density of the image represented by the input image data II.

B. Variations of the Embodiment (1) In the halftone process of FIG. 6 described in the embodiment, the following two actions are performed to improve the quality of the printed image. The first action is to make the output areas OA larger than their corresponding input areas IA so that they include portions of overlap with adjacent output areas OA. The second action is to add an input parameter r to the input for the machine learning model MM so that the machine learning model MM outputs a plurality of differing sets of partial dot data OD for the same input image data. As a variation of the embodiment, the halftone process may include just one of these two actions and not the other.

(2) In the halftone process of FIG. 6 described in the embodiment, the values for some pixels in the overlapping portion of the output areas OA1 and OA2 (the left-side portion LA in FIG. 8B) are set to the values in the partial dot data OD1, while the values for the remaining pixels are set to the values in the partial dot data OD2. However, the values for pixels in this overlapping portion may be generated according to another method using the partial dot data OD1 and OD2. For example, the CPU 210 may use values in the partial dot data OD1 for values in the C and M layers among the pixel values in the overlapping portion, and may use values in the partial dot data OD2 for values in the Y and K layers.

(3) Further, the pixels in the overlapping portion of the output areas OA1 and OA2 that use values from the partial dot data OD1 and the pixels in the overlapping portion of the output areas OA1 and OA2 that use values from the partial dot data OD2 are selected randomly. However, these pixels may be selected according to one of a plurality of preset selection patterns.

(4) In the embodiment described above, the halftone process of FIG. 6 is executed on photo regions, while a halftone process according to a dither method is executed on text and graphic regions. As a variation, the halftone process of FIG. 6 may be executed on background regions having colors other than white (a colored background for text or graphics, for example), while a halftone process using the dither method may be executed on regions different from these background regions, for example. Alternatively, the halftone process of FIG. 6 may be executed on the entire target image OI.

A halftone process different from the halftone process in FIG. 6 may instead be executed on input image data having a pattern of specific gradation values, while the halftone process of FIG. 6 is executed on all other input image data. For example, in some cases input image data whose pixels are all white should be converted to partial dot data specifying no dots are to be formed for all pixels and should not be converted to z number of types of different dot data corresponding to the input parameter r. In these cases, the partial input image data need not be subjected to the halftone process of FIG. 6.

(5) The loss function described in the embodiment is merely one example for calculating the loss value Lall used in the training process of FIG. 10. For example, one or both of the second term that includes the overlap evaluation value Lcor and the third term that includes the graininess evaluation value Lgs may be omitted from the four terms in equation (6).

(6) The machine learning model MM may take on various other configurations in addition to the configuration illustrated in FIG. 4C. For example, the neural network NN may include two or more middle layers ML. Additionally, the neural network NN may be a convolutional neural network (CNN) that includes a convolutional layer and a pooling layer.

(7) In the present embodiment, the printer 100 is a printing device that prints color images using ink in the colors C, M, Y, and K. As a variation, the printer 100 may be a printing device that prints monochromatic images using a single color of ink (black (K), for example).

(8) In the present embodiment described above, the printer 100 is an inkjet printing device, but the printer 100 may be an electrophotographic printing device (laser printer) that prints images using toner as the printing agent to form dots on paper.

(9) In the embodiment described above, the terminal device 200 is the device that executes the image process of FIG. 2, but the CPU of the printer 100 may serve as the image processing device for executing the image process of FIG. 2. In this case, in S80 of FIG. 2 the CPU of the printer 100 functioning as the image processing device outputs a print job to a prescribed memory area provided by the printer 100. A printing mechanism provided in the printer 100 then performs a print according to the print job outputted to this memory area.

As can be seen from the above description, in the embodiment described above, the terminal device 200 is an example of the image processing device of the present disclosure, and the printer 100 is an example of the printer of the present disclosure. In the variations, the CPU of the printer 100 is an example of the image processing device of the present disclosure, and the printing mechanism (not illustrated) provided in the printer 100 is an example of the printer of the present disclosure.

(10) The device executing the image process of FIG. 2 may also be a server, for example, that acquires image data from a printer or a terminal device and uses the image data to generate a print job. This type of server may be configured of a plurality of computers capable of communicating with each other over a network. In this case, the computers that can communicate with each other over the network are collectively an example of the image processing device of the present disclosure.

(11) Part of the configuration implemented in hardware in the embodiment described above may be replaced with software and, conversely, all or part of the configuration implemented in software may be replaced with hardware. For example, the machine learning model MM may be implemented with hardware circuits, such as an application-specific integrated circuit (ASIC), rather than a program module.

While the description has been made in detail with reference to specific embodiments, it would be apparent to those skilled in the art that many modifications and variations may be made thereto.

What is claimed is:

1. An image processing device configured to perform an image process for a printer, the printer being configured to form dots on a printing medium using colorant, the image processing device comprising a controller configured to perform:
    (a) acquiring target image data representing a target image, the target image having a plurality of pixels; and
    (b) generating dot data specifying a dot formation state for each of the plurality of pixels in a print image corresponding to the target image, the generating in (b) comprising
        (b1) inputting a first dataset into a machine learning model and causing the machine learning model to output first partial dot data, the first dataset including first partial image data and a first value for an input parameter, the first partial image data corresponding to the target image data within a first input area in the target image, the first partial dot data specifying a dot formation state for each pixel in a first output area, the first output area including a first corresponding area corresponding to the first input area in the print image,
        (b2) inputting a second dataset into the machine learning model and causing the machine learning model to output second partial dot data, the second dataset including second partial image data and a second value for the input parameter, the second partial image data corresponding to the target image data within a second input area different from the first input area in the target image, the second value being different from the first value, the second partial dot data specifying a dot formation state for each pixel in a second output area, the second output area including a second corresponding area corresponding to the second input area in the print image, and (b3) generating the dot data using the first partial dot data and the second partial dot data, wherein the machine learning model is configured to output the second partial dot data different from the first partial dot data according to the second value being different from the first value even when the second partial image data is identical to the first partial image data, wherein the second input area is adjacent to the first input area in the target image, the first corresponding area is adjacent to the second corresponding area in the print image, wherein the first output area includes the first corresponding area and a first overlapping area overlapping with the second corresponding area, wherein the second output area includes the second corresponding area and a second overlapping area overlapping with the first corresponding area, and wherein the first output area and the second output area overlap each other with an overlapping area including the first overlapping area and the second overlapping area.

2. The image processing device according to claim 1, wherein the overlapping area has a plurality of overlapping pixels including a first pixel and a second pixel, and wherein the generating in (b3) sets a value of the first pixel in the dot data to a value of the first pixel in the first partial dot data, and sets a value of the second pixel in the dot data to a value of the second pixel in the second partial dot data.

3. The image processing device according to claim 2, wherein the generating in (b3) randomly selects the first pixel and the second pixel from among the plurality of overlapping pixels in the overlapping area.

4. The image processing device according to claim 1, wherein the controller is configured to further perform (c) identifying a first region and a second region in the target image, the first region including a photograph, the second region including an image other than the photograph, and (d) executing a halftone process on the target image data within the second region without using the machine learning model to generate the dot data corresponding to the second region, and wherein the generating in (b) is performed on the target image data within the first region to generate the dot data corresponding to the first region.

* * * * *